G. C. SHEPHERD.

TEMPORARY BINDER.

APPLICATION FILED SEPT. 29, 1909.

Reissued Sept. 26, 1911.

13,294.

2 SHEETS—SHEET 1.

Witnesses:

C. F. Mason.

E. M. Allen.

Inventor:

Gilbert C. Shepherd by Attorneys

Southgate & Southgate.

G. C. SHEPHERD.

TEMPORARY BINDER.

APPLICATION FILED SEPT. 29, 1909.

Reissued Sept. 26, 1911.

13,294.

2 SHEETS—SHEET 2.

Witnesses:

C. F. Nesson

E. M. Allen.

Inventor:

Gilbert C. Shepherd by Attorneys

Southgate & Southgate.

UNITED STATES PATENT OFFICE.

GILBERT C. SHEPHERD, OF NEW YORK, N. Y., ASSIGNOR TO OFFICE SPECIALTIES DE LUXE, INCORPORATED, OF WORCESTER, MASSACHUSETTS, A CORPORATION OF MASSACHUSETTS.

TEMPORARY BINDER.

13,294. Specification of Reissued Letters Patent. Reissued Sept. 26, 1911.

Original No. 920,780, dated May 4, 1909, Serial No. 196,882. Application for reissue filed September 29, 1909. Serial No. 520,229.

*To all whom it may concern:*

Be it known that I, GILBERT C. SHEPHERD, a citizen of the United States, and a resident of the city of New York, borough of Brooklyn, county of Kings, and State of New York, have invented a new and useful Improvement in Temporary Binders, of which the following is a specification.

The object of my invention is to provide a binder of this class in which the leaves or pages are held firmly and securely, and from which said pages may be removed without difficulty or delay, and replaced as desired. This object is accomplished by means hereinafter described.

For a more particular description of certain embodiments of my invention, reference is to be had to the accompanying drawings forming a part hereof, in which—

Figure 1:
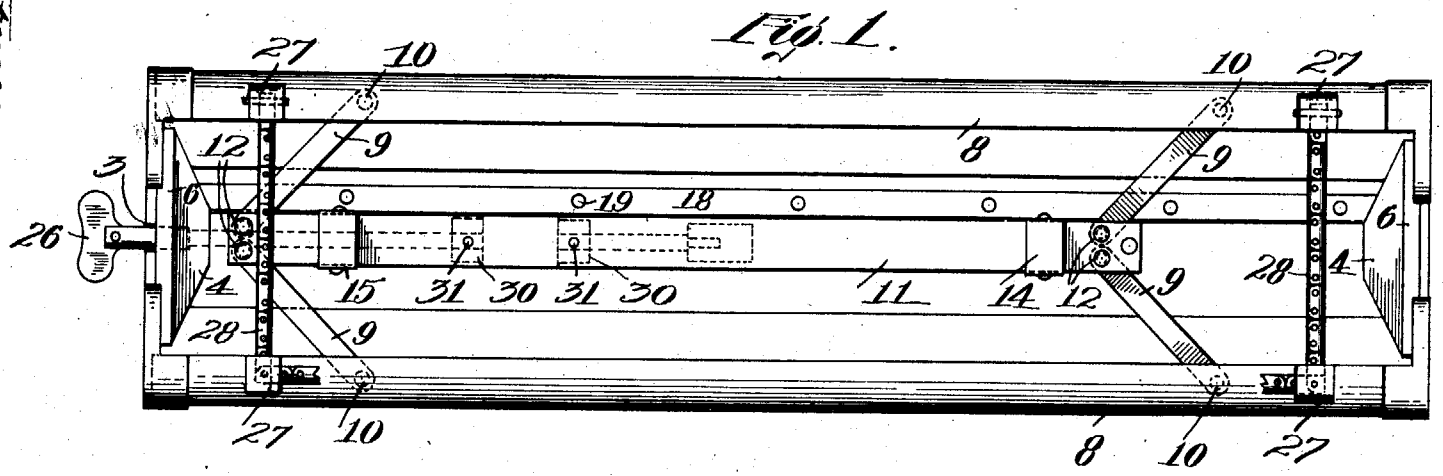
Figure 2:
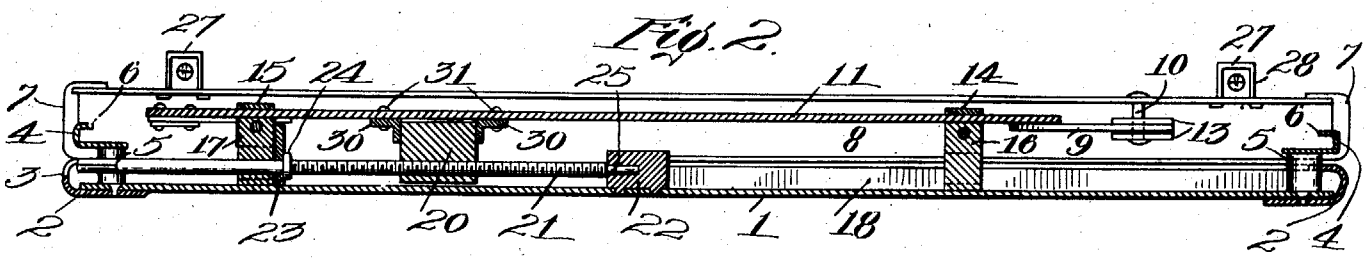
Figure 3:
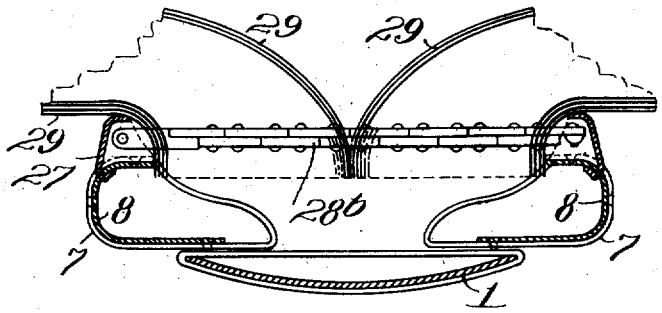
Figure 4:
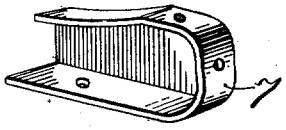
Figure 8:
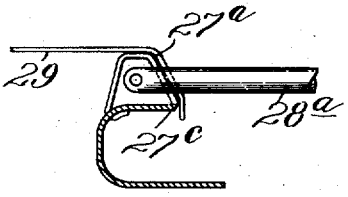
Figure 5:
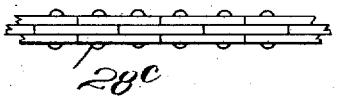
Figure 7:
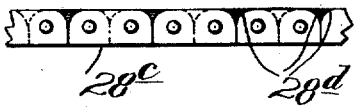
Figure 6:
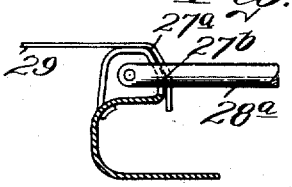

Figure 1 is a plan view of a binder provided with my improvement. Fig. 2 is a longitudinal section of the same. Fig. 3 is a sectional view showing the manner in which the sheets are held in place and the pages flexed, irrelevant parts being omitted. Fig. 4 is a perspective view of a slightly modified form of cap used on the clamp of the binder. Figs. 5 and 6 are detailed views showing different forms of housing for the binder fingers. Figs. 7 and 8 are side plan and elevations respectively, of a peculiar type of binder fingers.

Throughout the various views of the drawings, similar reference characters designate similar parts.

My improved binder comprises a back 1 with angle metal caps 2 riveted or otherwise secured to each end. One of these caps is recessed at 3 for a purpose which will appear below and both extend and run parallel to guides 4, which are also composed of angle metal, and are supported on the back 1 by means of pillars 5. The guides 4 may be given any suitable shape, but are preferably provided with flanges 6, as clearly shown in Figs. 1 and 2, so that the caps 7 at each end of the clamps 8 may freely slide on the guides 4, and yet always be parallel to each other in all directions which these clamps 8 occupy.

The clamps 8 are preferably made of sheet metal bent into the form shown in Fig. 3, and are provided at each end with the flanged caps 7 which are riveted or otherwise fixedly secured to said clamps. The clamps 8 are brought together, or separated by means of toggle levers 9, which are connected with said clamps 8 by means of studs 10, and at the other ends these toggles 9 are connected with a slide 11 by means of studs 12, which studs 12 are placed near each end of the slide 11. To properly hold the toggles 9 in place the studs 10 hold the toggles in the brackets 13, which may or may not be dispensed with, as desired. The slide 11 moves only in the direction of its length and is secured and held so as to move only in this way, by means of guides 14 and 15, which are secured to pillars 16 and 17 respectively, which pillars are secured to the back 1. Extending through the length of the binder is the longitudinally disposed angle plate 18 which is secured by rivets 19 to the back 1 a little to one side of its longitudinal center to brace the curved back throughout its length.

The slide 11 has brackets 30 on each side of the nut 20, which engages a screw 21, which screw is journaled in a block 22 at its inner end, which block is riveted to the back 1, and intermediate of its end this screw 21 is journaled in the plate 23. A collar 24 integral with the screw 21 and a shoulder 25 which bears against the block 22 prevent the screw 21 from having any longitudinal movement, so that when this screw is rotated the nut 20 is moved in the direction of the axis of the slide 11, and the screw 21 is made square or noncircular at its outer end, so that this screw can be turned by a key 26, which passes through the recess 3. From this it is obvious that by turning the key 26 when in the position shown in Fig. 1, the slide 11 is moved in the direction of its length and the toggle arms 9 act to either draw together or separate the clamps 8. The clamps 8 are provided with housings 27, from which and into which fingers 28 extend. As both the housings and binding fingers are somewhat complex, I will describe both separately and at some length.

The binding fingers may be of the conventional form as shown in Figs. 5 and 6, in which each binding finger comprises a bar $28^a$, which is pivotally mounted in a housing, or it may comprise a chain as shown in Figs. 1, 3, 8 and 7, which chain may be varied as desired. In Figs. 3, 5 and 6, the housing is shown as a hollow metal lug with a pivot running parallel to the longitudinal axis of the binder, and is pivoted to the binding pin, this housing being so shaped that the pages are flexed through the line of perforations and clamped below this line.

In Fig. 3 is shown a chain binding finger in which two rows of links are pivotally connected to form a chain finger $28^b$, and in Figs. 8 and 7 is shown a modification in which three rows of links are riveted together in a manner somewhat similar to an ordinary sprocket chain to form a chain binding finger $28^c$. Because of the peculiar constructions of the chain shown in Figs. 8 and 7 it is obvious that the joints are staggered between the intermediate row of links and the outside rows of links on each side thereof, so that the chain is continuous and without a break extending through one edge or side thereof, under all conditions incident to its use in the binder, while holding the sheets so that the sheets cannot possibly be caught between the abutting ends of the links under any conditions. In either case, the chain finger is rigid in the direction of the axes of the rivets, and preferably is made as shown in Fig. 7 with the edges curved at one side only, as indicated at $28^d$, so that these chain fingers can be flexed as indicated in Fig. 1, and in no other way. From this it is apparent that these chains will hold the pages as rigidly as rods, because each chain can be flexed only in one direction, and as the two chains are flexible in opposite directions, and connected by pages or sheets, each will stiffen the other and prevent any undue separating of the leaves or pages, allowing that portion of the chain that extends beyond the edge of the binder to be bent over out of the way of the cover. The housing 27 may be made in various forms, as shown in Figs. 1, 3, 5, and 6. The housing 27 is closed on all sides except two in the form shown in Fig. 1 at the free ends of the flexed chains 28 so that these chains can pass into and out of said housing as indicated in said figure, the link of the chain 28 against the wall of the housing 27 holds the chain with sufficient firmness in each instance.

In Fig. 6 the page 29 in addition to being flexed at the point $27^a$ is also flexed at the point $27^b$ which is in alinement with the perforations of the page 29.

In Fig. 5, the page 29 is flexed when the binder is open at the point $27^a$, and also at the point $27^c$, which is just below the binding finger. In this latter construction, the page may be opened for a greater portion of its length, beyond the binding fingers, which is found to be a great advantage, as it enables a greater portion of the surface of the page 29 to be utilized. In the structure shown in Fig. 3 this result is even better obtained by having the page 29 held by the clamps 8 below the housings 27, so that these pages are flexed considerably below their perforations. This construction holds the pages 29 securely, and yet permits a maximum surface to be utilized, as the sheets 29 bend through the perforations that hold them in place, features which are of great and material advantage when one considers that hundreds of pages or sheets are used in each of these temporary binders.

What I claim is:—

1. In a temporary binder or similar device, a back, binding fingers and clamps connected with said binding fingers, said clamps being so shaped that when the sheets are held in said temporary binder, said fingers will pass through perforations in said sheets, and said sheets will be clamped below said fingers, and also flexed through the line of perforations.

2. In a temporary binder or similar device, binding fingers passing through perforated sheets and clamps fixedly holding said sheets below the perforations, whereby the pages are flexed through the perforations and a maximum surface is available for use.

3. In a temporary binder or similar device, binding fingers and clamps connected with said binding fingers, said clamps being so shaped that when sheets are held in said temporary binder, the fingers will pass through the perforations in these sheets and the said sheets will be clamped below said fingers, and also flexed through the line of perforations when the binder is opened.

4. In a temporary binder or similar device, means for fixedly holding the edges of sheets, and binding fingers passing through perforations in said sheets above the point where said sheets are held, whereby the sheets are held fixedly with regard to the binder when the book is open and the sheets are in use.

5. In a temporary binder or similar device, means for clamping and holding perforated sheets, fingers adapted to pass through said perforations, above the part where the sheets are clamped, so that when the book is open the sheets are flexed through said perforations, and means for holding said binding fingers securely in place.

In testimony whereof I have hereunto set my hand, in the presence of two subscribing witnesses.

GILBERT C. SHEPHERD.

Witnesses:
E. M. Dean,
J. H. Sykes.